(12) United States Patent
Phillips et al.

(10) Patent No.: US 7,628,381 B2
(45) Date of Patent: Dec. 8, 2009

(54) METHOD FOR REPLACING SEALS IN RECREATIONAL VEHICLES GATE VALVES WITHOUT REMOVING VALVE HOUSING FROM PLUMBING

(75) Inventors: David L. Phillips, Santa Ana, CA (US); Ashfaq M. Mir, Fountain Valley, CA (US); Rufino Naval, Jr., San Juan Capistrano, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 170 days.

(21) Appl. No.: 11/728,194

(22) Filed: Mar. 23, 2007

(65) Prior Publication Data

US 2008/0230124 A1    Sep. 25, 2008

(51) Int. Cl.
*F16K 3/00*    (2006.01)
(52) U.S. Cl. .................. 251/328; 251/326; 137/15.23; 137/315.29
(58) Field of Classification Search ......... 251/326–329, 251/333; 137/15.23, 315.29
See application file for complete search history.

(56) References Cited

U.S. PATENT DOCUMENTS

| | | | |
|---|---|---|---|
| 1,031,539 A | 7/1912 | Donovan | |
| 1,381,938 A | 6/1921 | Sheafor | |
| 2,007,036 A | 7/1935 | Cornell, Jr. | |
| 2,652,946 A | 9/1953 | Beatty | |
| 3,316,929 A | 5/1967 | Milette | |
| 3,624,882 A | 12/1971 | Gustafson | |
| 3,726,306 A | 4/1973 | Purvis | |
| 3,993,092 A | 11/1976 | Still | |
| 4,693,452 A | 9/1987 | Jandrasi | |
| 5,020,776 A * | 6/1991 | Owens et al. | ............... 251/327 |
| 5,096,099 A | 3/1992 | Wiese | |
| 5,653,423 A * | 8/1997 | Young et al. | ................ 251/328 |
| 5,890,700 A * | 4/1999 | Clarkson et al. | ............ 251/327 |
| 6,378,555 B2 | 4/2002 | Kyle | |
| 6,959,912 B2 * | 11/2005 | Reeves et al. | ............... 251/214 |

FOREIGN PATENT DOCUMENTS

JP    06-129549    5/1994

OTHER PUBLICATIONS

Patent Abstracts of Japan—English Translation of JP Publication 06-12954 Dated May 10, 1994.

* cited by examiner

*Primary Examiner*—John K Fristoe, Jr.

(57) ABSTRACT

The present invention provides a method for replacing seals in recreational vehicles gate valves without removing valve housing from plumbing. The method for replacing blade seals in a gate valve features coupling a valve housing of the gate valve to suitable plumbing, the valve housing having a removable blade seal cartridge slidably arranged and latched therein in order to receive a movable blade of a drive unit of the valve gate to control the flow of the medium through the valve gate and to prevent the medium from entering the drive unit; and unlatching the removable blade seal cartridge from the valve housing so as to enable replacement of the blade seal cartridge without having to remove the valve housing from the suitable plumbing.

16 Claims, 5 Drawing Sheets

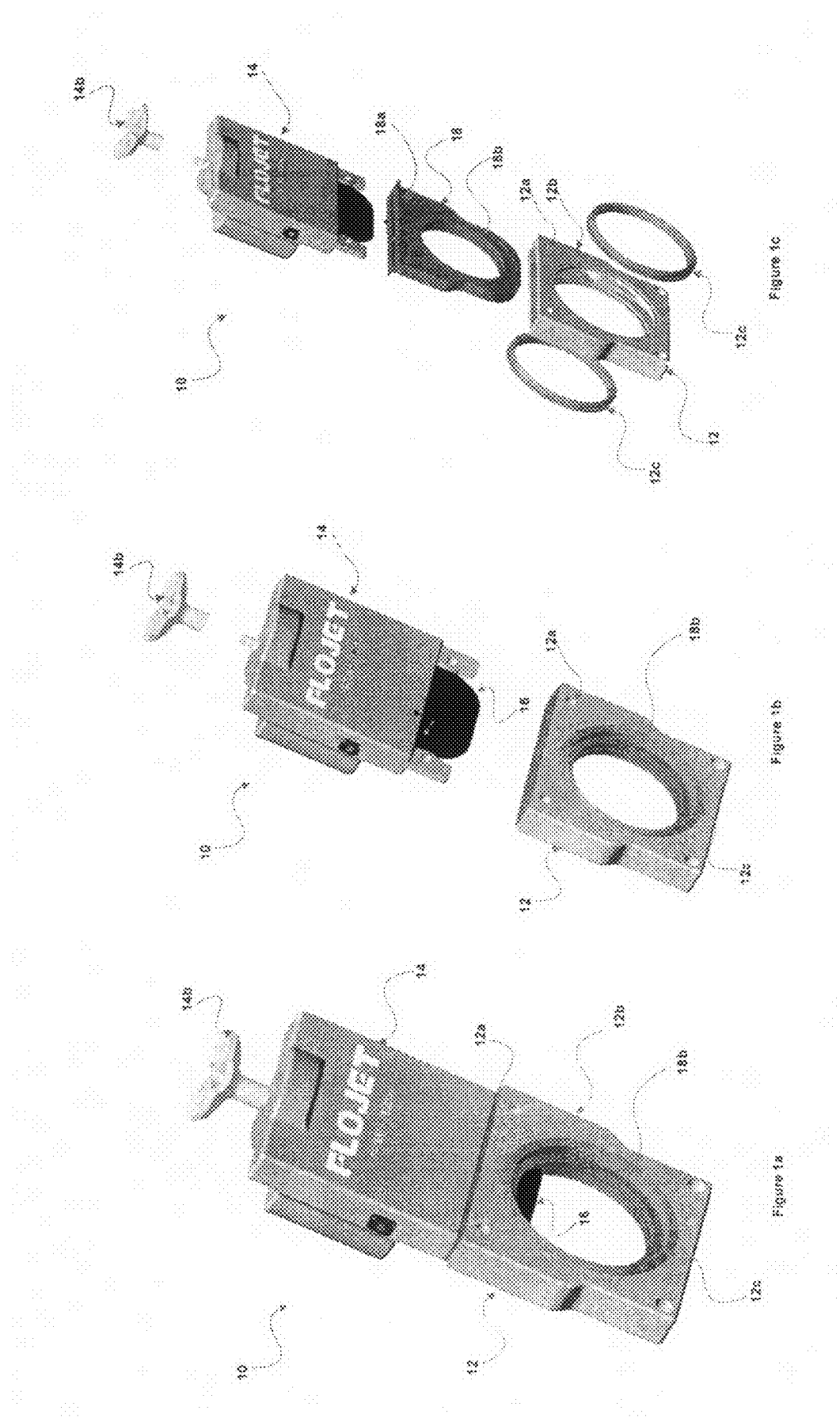

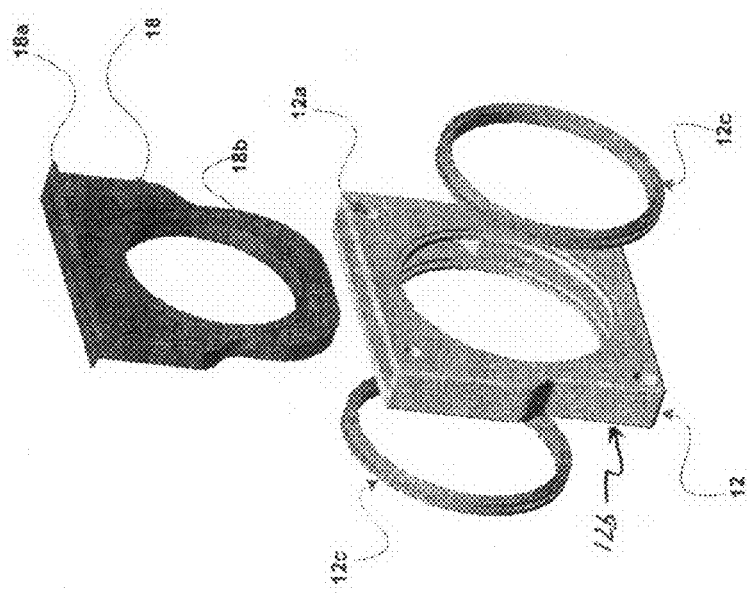
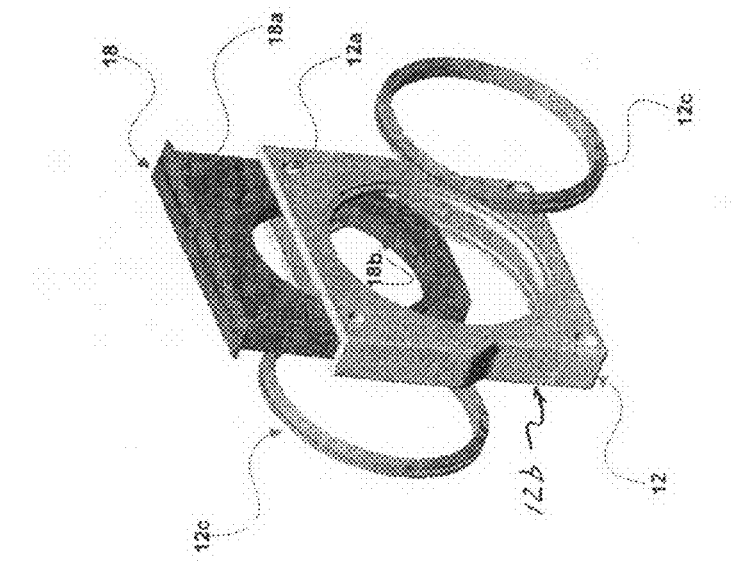
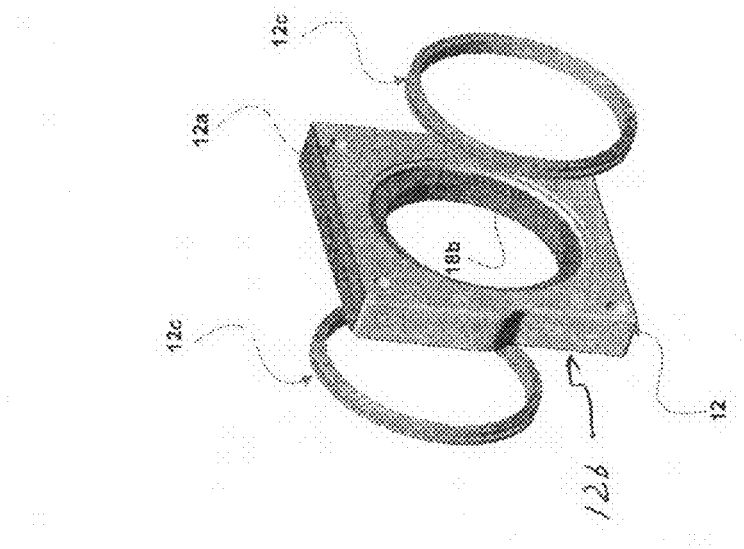

METHOD FOR REPLACING SEALS IN RECREATIONAL VEHICLES GATE VALVES WITHOUT REMOVING VALVE HOUSING FROM PLUMBING

BACKGROUND OF THE INVENTION

1. Field of the Invention

The present invention relates to a method for replacing blade seals; and more particularly to a method for replacing blade seals in recreational vehicle gate valves without removing a valve housing from the plumbing.

2. Brief Description of Related Art

In a typical application for replacing blade seals in recreational vehicle gate valves, one must remove a valve housing in whole from a plumbing system in order to conduct maintenance or replace damaged seals. However, the removing of the valve housing from the plumbing system is difficult and results in the possibility of breaking or damaging the plumbing. Also putting the seals back in are difficult due to having to hold them in place so they will not slip during assembly. In view of this, there is a need in the industry for a better way of replacing blade seals in recreational vehicle gate valves.

SUMMARY OF THE INVENTION

In its broadest sense, the present invention provides a new and unique method for replacing seals in recreational vehicles gate valves without removing valve housing from plumbing.

The method for replacing blade seals in a gate valve features coupling a valve housing of the gate valve to suitable plumbing, the valve housing having a removable blade seal cartridge slidably arranged and latched therein in order to receive a movable blade of a drive unit of the valve gate to control the flow of the medium through the valve gate and to prevent the medium from entering the drive unit; and unlatching the removable blade seal cartridge from the valve housing so as to enable replacement of the blade seal cartridge without having to remove the valve housing from the suitable plumbing.

The unlatching may include removing one or more fastening devices from one or more apertures coupling the blade seal cartridge and the valve housing, as well as uncoupling the drive unit and the blade seal cartridge as part of the method.

With the seal cartridge design according to the present invention, one simply removes the drive mechanism, releases the seal cartridge, slips it out, removes and replaces the seals, then reinstalls the cartridge to the system to change the seals.

The present invention also features a blade seal cartridge and valve housing combination featuring the valve housing for coupling the gate valve to the suitable plumbing, having a latching mechanism and the removable blade seal cartridge slidably arranged in the valve housing in order to receive the movable blade of the drive unit of the valve gate to control the flow of the medium through the valve gate and to prevent the medium from entering the drive unit, where the removable blade seal cartridge has a corresponding latching mechanism for coupling and uncoupling to the latching mechanism of the valve housing so as to enable replacement of the blade seal cartridge without having to remove the valve housing from the suitable plumbing.

The latching mechanism and corresponding latching mechanism may include one or more associated apertures for receiving one or more associated fastening devices for coupling and uncoupling the blade seal cartridge and the valve housing, and the valve housing may include channels for slidably receiving the blade seal cartridge.

BRIEF DESCRIPTION OF THE DRAWING

FIGS. 1a, 1b and 1c show a gate valve according to the present invention, where FIG. 1a is a perspective view of the gate valve; where FIG. 1b is a partially exploded perspective view of the gate valve shown in FIG. 1a; and where FIG. 1c is a fully exploded perspective view of the gate valve shown in FIG. 1a.

FIG. 2a is a view of the inside of the drive unit; where FIG. 2b is a view of the drive with gear and thread, drive motor and blade of the drive unit shown in FIG. 2a; and where FIG. 2c is a partially exploded view of the drive with gear and thread, drive motor with gear and blade shown in FIG. 2b.

FIGS. 3a, 3b and 3c show the valve housing of the gate valve shown in FIG. 1a according to the present invention, where FIG. 3a is one partially exploded perspective view of the valve housing shown in FIG. 1a; where FIG. 3b is another partially exploded perspective view of the valve housing shown in FIG. 3a; and where FIG. 3c is a fully exploded perspective view of the valve housing shown in FIG. 3a.

FIG. 4a is a side view of the assembled seal housing; where FIG. 4b is a perspective view of the assembled seal housing shown in FIG. 4a; where FIG. 4c is a partially exploded perspective view of the assembled seal housing shown in FIG. 4a having the seal removed from the housing with the plumbing still in place; and where FIG. 4d is a fully exploded perspective view of the assembled seal housing shown in FIG. 4a.

DETAILED DESCRIPTION OF THE INVENTION

Figure 2C:
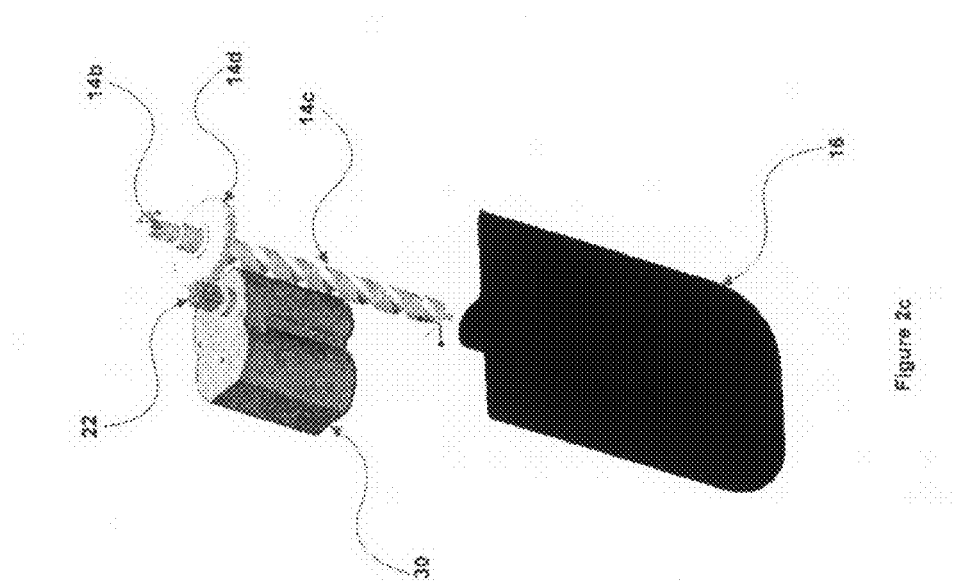
FIGS. 2a, 2b and 2c show the drive unit 14 of the gate valve shown in FIG. 1a according to the present invention, where

FIGS. 1a, 1b and 1c show an embodiment of a new and unique gate valve generally indicated as 10 for controlling the flow of a medium through suitable plumbing (see FIGS. 4a, 4b, 4c, 4d), featuring a valve housing (which may also be referred to as an "adapter unit") generally indicated as 12 for coupling the gate valve 10 to the suitable plumbing (see FIG. 4a, 4b, 4c, 4d); a detachable drive unit generally indicated as 14 having a movable blade 16 arranged therein; detachable blade seals or blade seal cartridge 18 for slidably arranging in the valve housing 12 in order to receive the movable blade 16 to control the flow of the medium through the gate valve 10 and to prevent the medium from entering the drive unit 14; and a latching mechanism 12a, 14a, 18a, for detachably coupling both the drive unit 14 and blade seals or blade seal cartridge 18 to and from the valve housing 12 so as to replace either the drive unit 14, the blade seals or blade seal cartridge 18, or both, without having to remove the valve housing 12 from the suitable plumbing (see FIG. 4a, 4b, 4c, 4d).

The latching mechanism 12a, 14a, 18a may include, by way of example, corresponding apertures 14a, 18a in the detachable drive unit 14 and blade seals or blade seal cartridge 18 that align with associated apertures 12a in the valve housing 12 and corresponding fastening devices (not shown) for passing through the corresponding apertures 12a, 14a, 18a to detachably couple the drive unit 14 and blade seals 18 to and from the valve housing 12.

Embodiments are also envisioned either where the latching mechanism includes two mechanism, such as a first latching mechanism for coupling the driving unit 14 to the blade seals 18 and a second latching mechanism for coupling the blade seals 18 to the valve housing 12; or where the latching mechanism couples the driving unit 14 to the valve housing 12 and holds the blade seals or blade seal cartridge 18 therein.

Figure 2B:
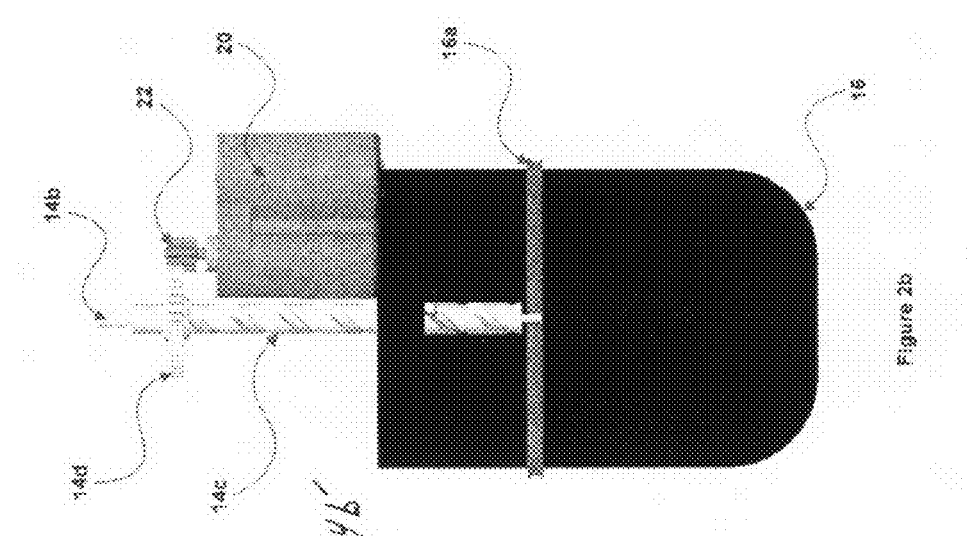
Figure 2A:
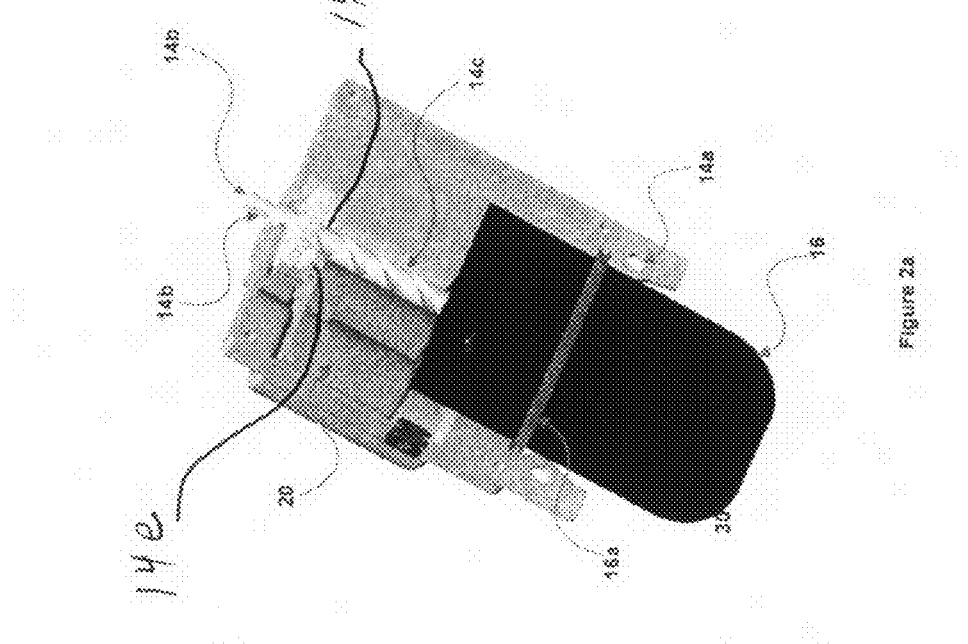
Figure 4B:
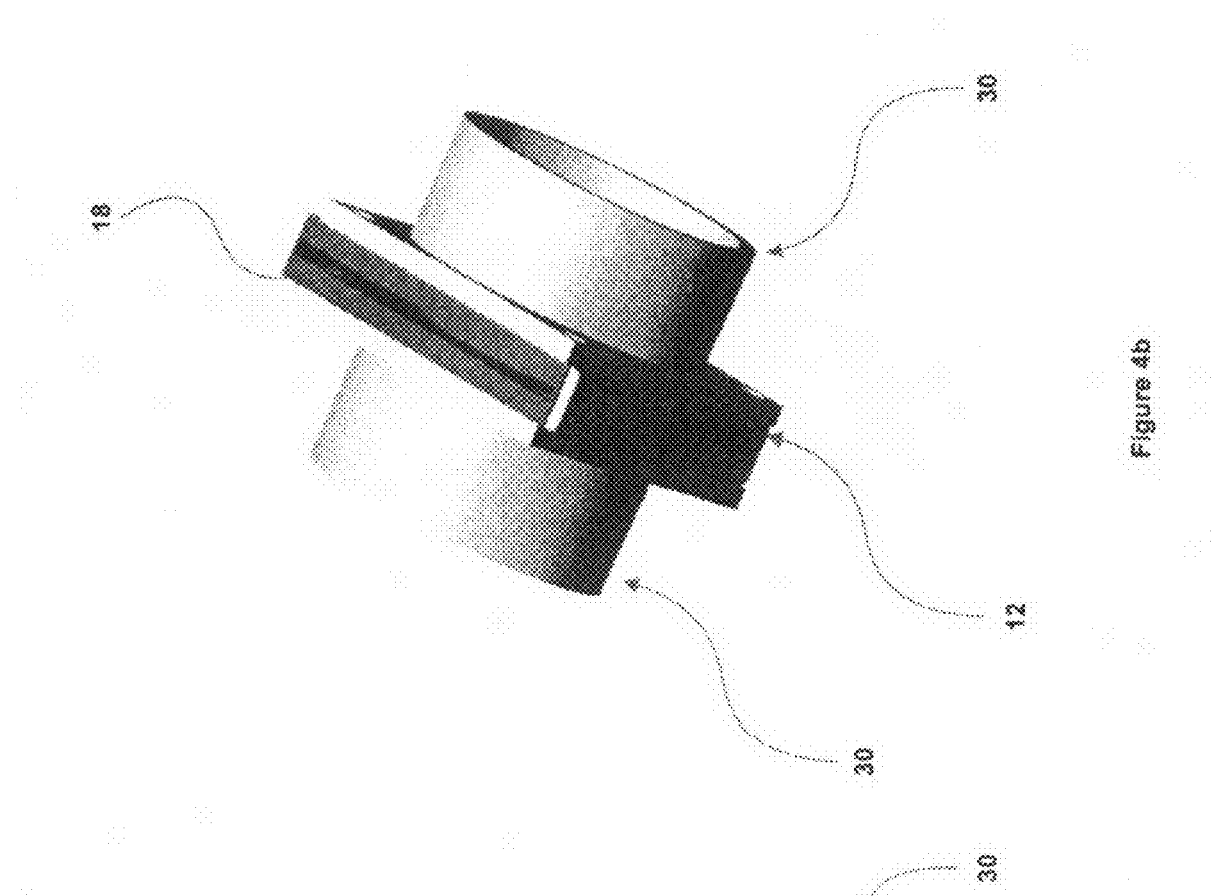
FIGS. 4a, 4b, 4c and 4d show an assembled seal housing according to the present invention, where
Figure 4A:
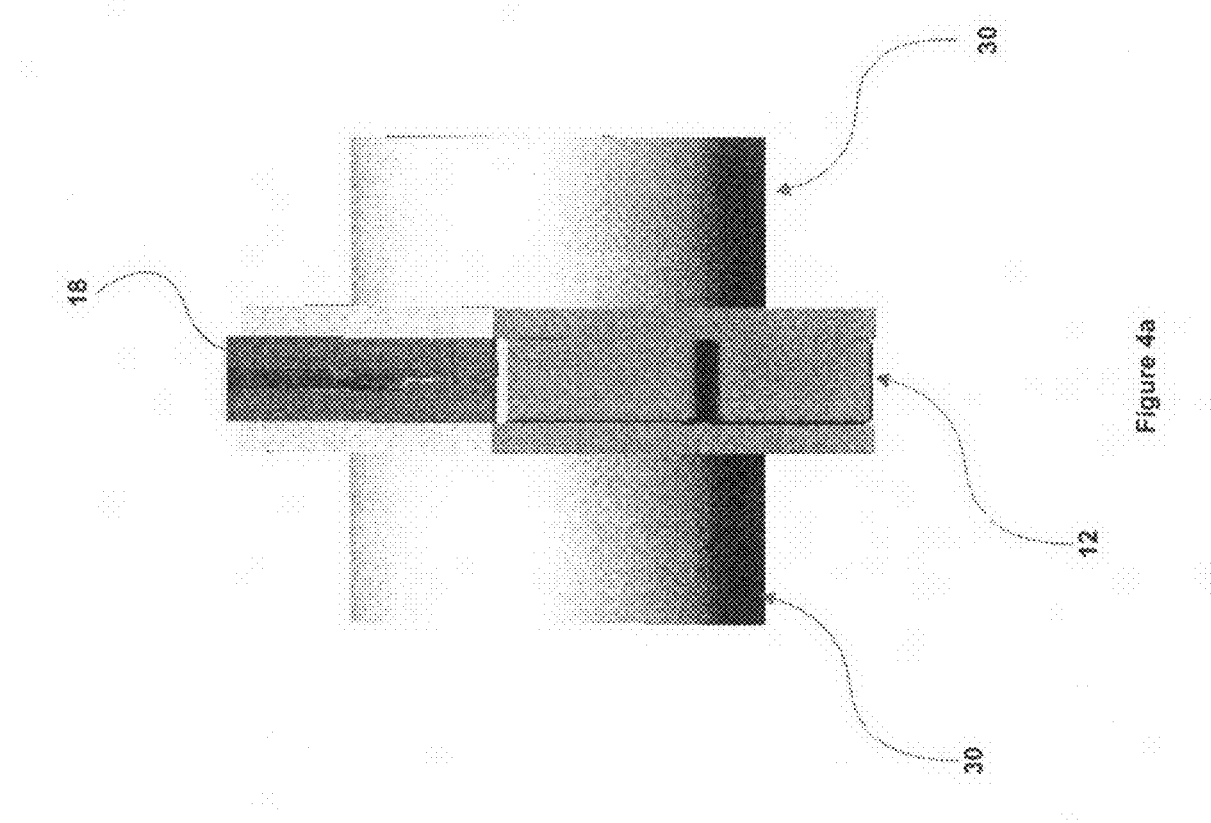
Figure 4D:
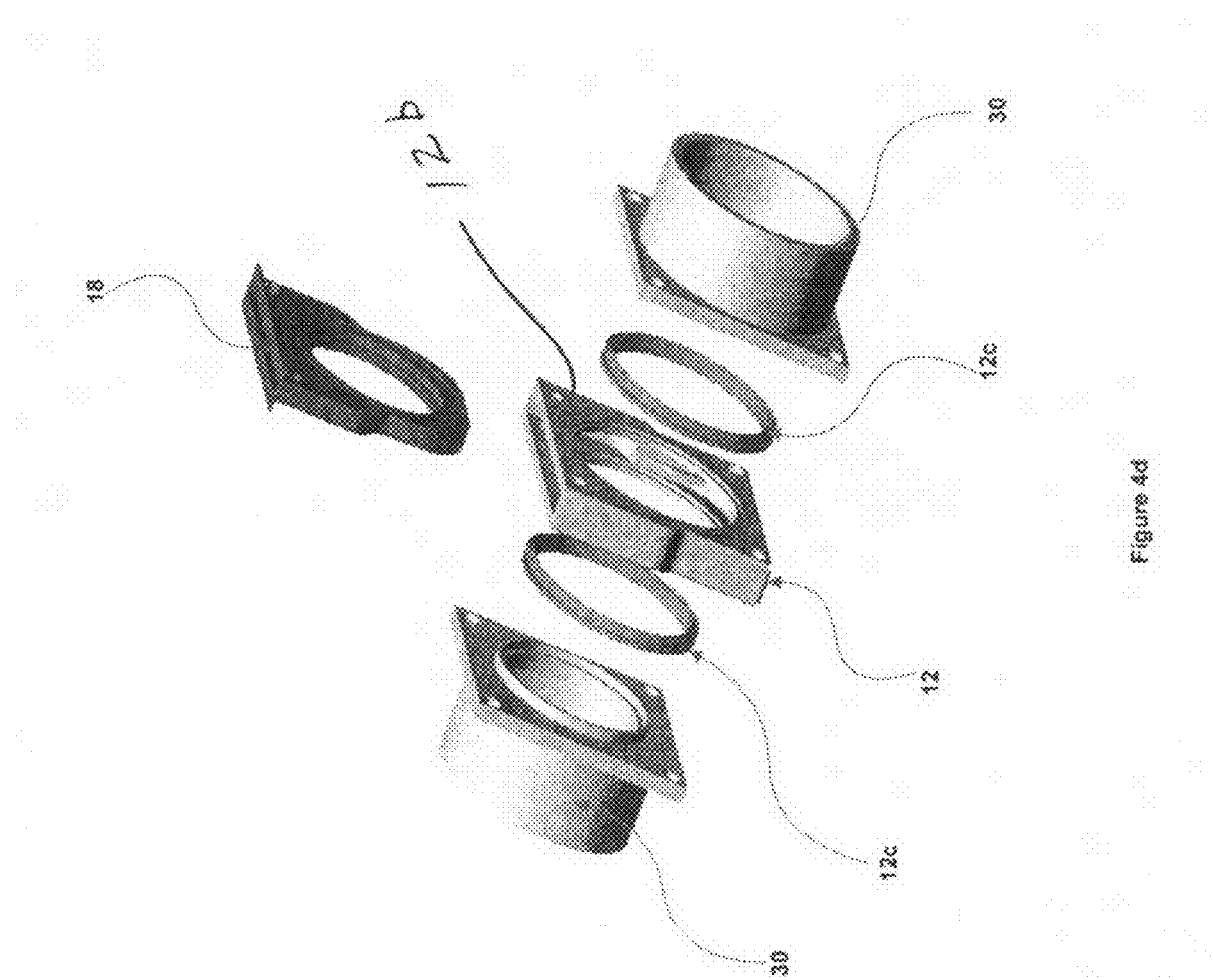
Figure 4C:
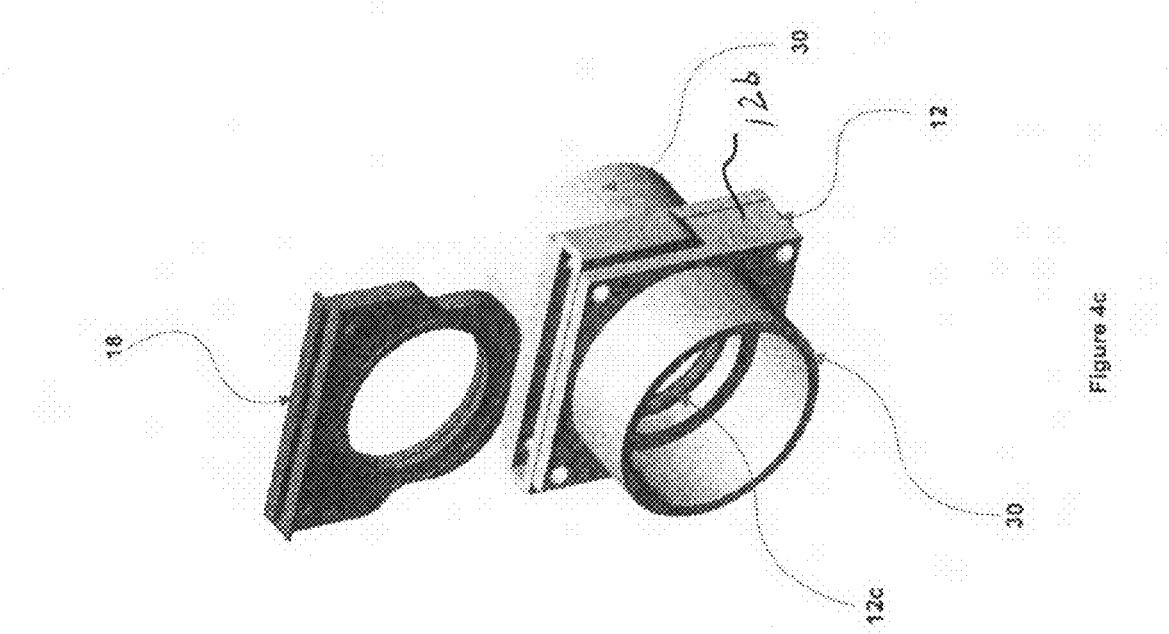

FIGS. 2a, 2b and 2c show the drive unit 14 in further detail, which may include a drive 14b with drive threads 14c and the blade 16 may include corresponding threads (not shown) for coupling to the drive threads 14c of the drive 14 to rotatably drive the movable blade 16 up and down. In operation, the movable blade 16 slides between the blade seals 16a that sweep the blade 16 clean keeping the medium from entering the drive unit 14.

In one embodiment, the drive unit 14 may be motorized. In this case, the drive 14b has a gear 14d arranged thereon, and the drive unit may include a motor 20 with a gear 22 coupled to the gear 14d of the drive 14b for electromechanically rotating the drive 14b. The drive unit 14 may also include a wave spring 14e for frictionally engaging the shaft 14b' of the drive 14b to switch the drive unit 14 between an electrical or manual operational mode.

Alternatively, the drive unit 14 may be manually operated by pulling the shaft 14b up, disengaging the gear 14d from the motor 22, and manually rotating the drive 14b.

In operation, the drive unit or housing 14 provides the drive to move the blade 16 up and down. The drive 14b can be operated either manual or motorized. The drive 14b is unique in that it allows in about two full turns for the user to fully open the gate valve. This results in less room being required to operate the gate valve as one does not have to pull a handle out. In the embodiment shown and described herein, the drive shaft 14c has two parallel tracks which accommodates a lubricated steel balls (not shown) or internal threads which in turn are housed in the blade 16. This reduces the frictional force loss considerably. In the motorized version, the motor 22 is geared to allow the user to turn the switch on and open the gate valve. In the event power is not available or the motor 22 fails, the same simple pull and turn allows the user to manually override the motor 22 and open and close the gate valve. The compartmentalized design of the gate valve 10 then allows the user to simply unlatch the drive unit 14 and replace it with another drive unit cartridge with no need for disassembling the plumping. The blade 16 forms part of the drive unit 14, and is designed so as to slide up and down the drive unit 14 itself with the drive 14b not moving out of the gate valve itself thus allowing for less room to be needed.

The valve housing 12 has a lower housing 12b (see FIGS. 1a and 1c) that has plumbing seals 12c and contains the blade seals or blade seal cartridge 18. As shown in FIGS. 4a, 4b, 4c, 4d, the valve housing 12 is installed into the plumbing line or system (not shown) using adapters 30 in the plumbing line and left permanently. The valve housing 12 receives or accepts the drive unit 14 into it and the two latches together, as described herein. The blade seals or blade seal cartridge 18 have seals 18b that the blade 16 slips through that each operation of the gate valve sweeps the blade 16 clean keeping the waste in the valve housing 12 and separate from the drive unit 14.

Alternative Embodiment

Embodiments are also envisioned where the drive unit 14 includes a detachable clip (not shown) for frictionally engaging the shaft 14b' of the drive 14b to switch the drive unit 14 between an electrical or manual operational mode. In this case, the shaft 14b' of the drive 14b may have at least one portion having a smaller diameter than the shaft for receiving a detachably clip for holding the shaft 14b in, for example, the manual operational mode.

The Method for Replacing Seals

The present invention also features a new and unique method for replacing seals in recreational vehicles gate valves without removing the valve housing 12 from plumbing system.

The method for replacing blade seals or the blade seal cartridge in the gate valve 10 features coupling the valve housing 12 of the gate valve 10 to the suitable plumbing system, the valve housing 12 having the removable blade seal or blade seal cartridge 18 slidably arranged and latched therein in order to receive the movable blade 16 of the drive unit 14 of the gate valve 10 to control the flow of the medium through the gate valve 10 and to prevent the medium from entering the drive unit 14; and unlatching the removable blade seal cartridge 18 from the valve housing 12 so as to enable replacement of the blade seal cartridge 18 and/or seals 18b without having to remove the valve housing 12 from the suitable plumbing.

The unlatching may include removing the one or more fastening devices (not shown) from one or more apertures 12a, 14a, and 18a coupling the blade seal cartridge 18 and the valve housing 12, as well as uncoupling the drive unit 14 and the blade seal cartridge 18 as part of the method.

The blade seal cartridge 18 is unique in that it allows the user to leave the valve housing 12 in the plumbing system or line and replace the blade seals or blade seal cartridge 18 by simply pressing it together and pulling it out of the valve housing 12, then replacing the seals 18b and/or the whole blade seal cartridge 18, and then sliding it back in the valve housing 12. Then by simply reinstalling the drive unit 14, one can resume usage. The seals 18b are held in place by the removable cartridge 18 allowing the user to easily replace the seals 18b and not to have to worry about pinching the seals 18b or the seals 18b slipping off. The design also provides easy maintenance in an already crowded environment.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

We claim:

1. Apparatus for coupling to a drive unit and arranging in a valve housing for adapting to suitable plumbing or plumbing adapters, the apparatus comprising:
    a removable blade seal cartridge configured to couple detachably to the drive unit and slide into the valve housing so as to enable replacement of the blade seal cartridge without having to remove the valve housing from the suitable plumbing or plumbing adapters, and
    one or more removable substantially circular blade seals that is arranged in a circular opening formed in the removable blade seal cartridge, that is configured to sweep clean opposing faces of a movable blade of the drive unit that controls the flow of the medium through the valve housing so as to keep the medium from entering the drive unit, and that is also configured to enable the replacement thereof without having to remove the valve housing from the suitable plumbing or plumbing adapters.

2. Apparatus according to claim 1, wherein the removable blade seal cartridge has a latching mechanism configured to couple and uncouple to a corresponding latching mechanism of the valve housing so as to enable replacement of the removable blade seal cartridge without having to remove the valve housing from suitable plumbing or plumbing adapters.

3. Apparatus according to claim 2, wherein the latching mechanism is configured in the form of one or more apertures to receive one or more corresponding fastening devices.

4. Apparatus according to claim 1, wherein the removable blade seal cartridge is configured to hold the removable substantially circular blade seals in place so as to allow a user to replace the removable substantially circular blade seals without pinching.

5. Apparatus according to claim 1, wherein the apparatus forms part of a valve gate.

6. A combination of a drive unit and a removable blade seal cartridge for coupling to a valve housing for adapting to suitable plumbing or plumbing adapters, wherein the removable blade seal cartridge is configured to couple detachably to the drive unit and slide into the valve housing so as to enable replacement of the removable blade seal cartridge without having to remove the valve housing from the suitable plumbing or plumbing adapters, the removable blade seal cartridge having one or more removable substantially circular blade seals that is arranged in an opening formed in the removable blade seal cartridge, that is configured to sweep clean opposing faces of a movable blade of the drive unit that controls the flow of the medium through the valve housing so as to keep the medium from entering the drive unit, and that is also configured to enable the replacement thereof without having to remove the valve housing from the suitable plumbing or plumbing adapters.

7. The combination according to claim 6, wherein the removable blade seal cartridge has a latching mechanism configured to couple and uncouple to a corresponding latching mechanism of the valve housing so as to enable replacement of the removable blade seal cartridge without having to remove the valve housing from suitable plumbing or plumbing adapters.

8. The combination according to claim 7, wherein the latching mechanism is configured in the form of one or more apertures to receive one or more corresponding fastening devices.

9. The combination according to claim 6, wherein the removable blade seal cartridge is configured to hold the removable substantially circular blade seals in place so as to allow a user to replace the removable substantially circular blade seals without pinching.

10. The combination according to claim 6, wherein the drive unit comprising a drive having a draft shaft with a first gear arranged thereon and being coupled to the movable blade for being raised and lowered, and a motor with a corresponding gear coupled to the first gear of the drive shaft for electromechanically rotating the drive shaft so as to raise and lower the movable blade into and out of the valve housing.

11. The combination according to claim 10, wherein the drive unit comprises a wave spring configured to frictionally engaging the shaft of the drive and to switch the drive unit between an electrical or manual operational mode.

12. The combination according to claim 10, wherein the drive unit is configured to operate manually by pulling the drive shaft up, disengaging the gear from the motor, and manually rotating the drive shaft so as to raise and lower the movable blade.

13. The combination according to claim 10, wherein the drive unit has one or more corresponding blades seals, that the movable blade slides between the one or more corresponding blade seals that sweep the movable blade clean keeping the medium from entering the drive unit.

14. The combination according to claim 10, wherein the combination forms part of a valve gate.

15. A removable blade seal cartridge assembly for coupling to a drive unit and arranging in a valve housing for adapting to suitable plumbing or plumbing adapters, comprising:
a removable blade seal cartridge configured with a circular opening formed therein for allowing the flow of a medium to pass through, and also configured to couple detachably to the drive unit and slide into the valve housing so as to enable replacement of the blade seal cartridge without having to remove the valve housing from the suitable plumbing or plumbing adapters; and
one or more removable blade seals that is arranged in the circular opening, that is configured to sweep clean opposing faces of a movable blade of the drive unit that controls the flow of the medium through the valve housing so as to keep the medium from entering the drive unit, and that is also configured to enable replacement thereof without having to remove the valve housing from the suitable plumbing or plumbing adapters.

16. A removable blade seal cartridge according to claim 15, wherein the opening is substantially circular and the removable blade seals are substantially circular.

* * * * *

UNITED STATES PATENT AND TRADEMARK OFFICE
CERTIFICATE OF CORRECTION

| | | |
|---|---|---|
| PATENT NO. | : 7,628,381 B2 | Page 1 of 1 |
| APPLICATION NO. | : 11/728194 | |
| DATED | : December 8, 2009 | |
| INVENTOR(S) | : David L. Phillips et al. | |

It is certified that error appears in the above-identified patent and that said Letters Patent is hereby corrected as shown below:

1. In column 3 at line 42, "plumping" should be --plumbing--.

Signed and Sealed this
Twenty-second Day of March, 2011

David J. Kappos
*Director of the United States Patent and Trademark Office*